2,161,431

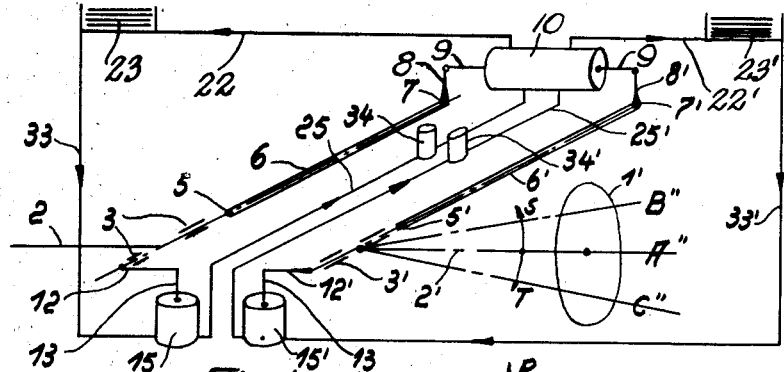
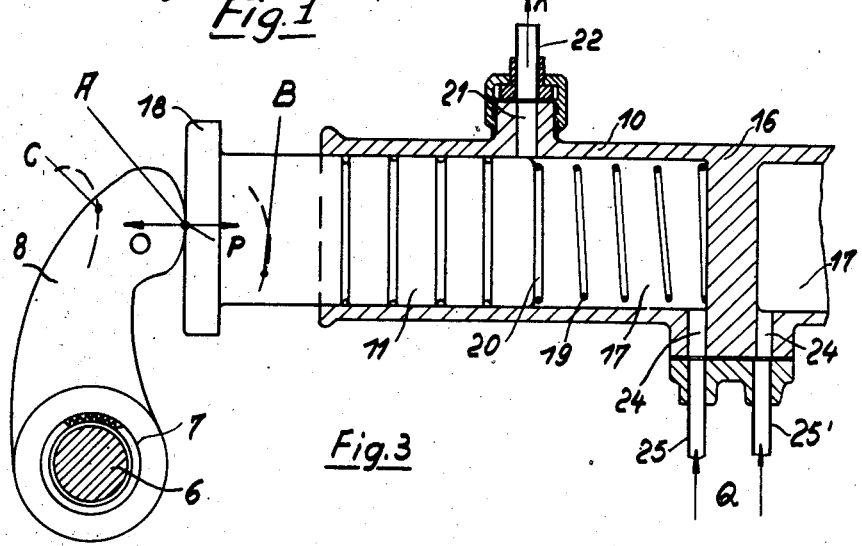
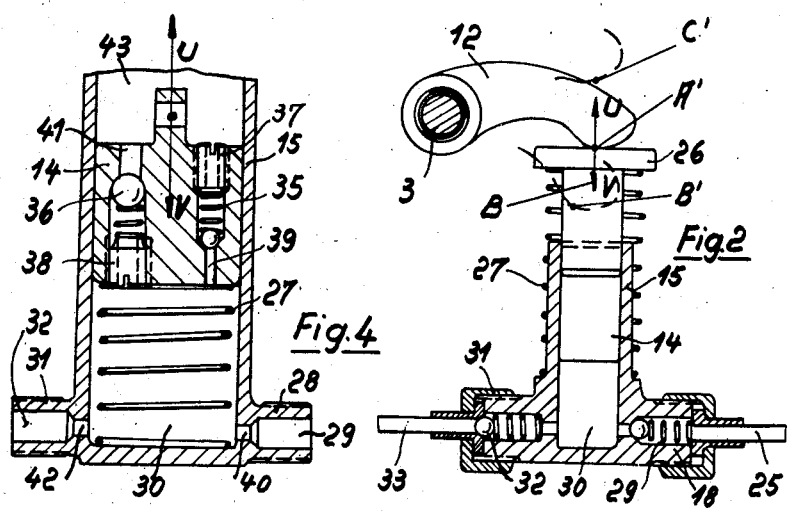
June 6, 1939. K. RABE 2,161,431
SPRING SUSPENSION
Filed Oct. 12, 1934
Inventor:
Karl Rabe Patented June 6, 1939

UNITED STATES PATENT OFFICE 2,161,431

SPRING SUSPENSION

Karl Rabe, Stuttgart, Germany, assignor to Dr. ing. h. c. F. Porsche, K.-G., Stuttgart-Zuffenhausen, Germany, a company of Germany Application October 12, 1934, Serial No. 748,051
In Germany October 16, 1933

20 Claims. (Cl. 267—57)

This invention relates to an apparatus for regulating the tension of springs on power vehicles, and more particularly deals with the regulation of the tension of rotary springs in accordance with the vehicle load.

An object of this invention is accordingly the provision of improved and novel means for regulating the tension of the springs of a vehicle.

A further object of this invention is the provision of means for adjusting the abutments of rotary vehicle springs.

Another object of this invention is the provision of improved fluid pressure means for varying the tension of vehicle springs.

A still further object of this invention is the provision of fluid pressure means responsive to the vehicle load for proportionately regulating the tension of the vehicle springs.

A specific object of this invention is the provision of a novel fluid pressure system including a pump responsive to the vibrations of the vehicle for driving a piston for controlling the tension of the vehicle springs.

Generally speaking, this invention may be defind as comprising the constructions and combinations recited in the annexed claims and illustrated in certain embodiments in the drawing accompanying and forming a part of this application, wherein:—

Fig. 1 is a diagrammatic view of the apparatus from the rear end of the vehicle.

Fig. 2 is a vertical section through the pump cylinder.

Fig. 3 is a vertical section through the control cylinder, and

Fig. 4 is a vertical section through a modified pump piston, constructed as a shock absorber.

The swinging half-axles 2, 2' carrying the wheels 1' are attached on to two pins or trunnions 3, 3' on both sides of the axle housing (not shown) which is preferably disposed in the longitudinal middle plane. The front of the pins 3, 3' are connected at 5, 5' with spring rods 6, 6' preferably but not necessarily arranged co-axially with them. The front ends 7, 7' of the spring rods 6, 6' are connected with levers 8, 8' and supported as abutments on the piston 11 by suitable means such as a lever arrangement 9, 9', which are guided in a common cylinder casing 10 secured on the frame. The rear of the pins 3, 3' are connected with the levers 12, 12' which are attached by means of a lever arrangement 13, 13' to the pistons 14, 14' of two pumps 15, 15' secured on the frame (Fig. 1). The cylinder casing 10 is shown as divided by an intermediate wall 16 into two chambers 17, 17' in which the pistons 11, 11', constructed as plungers, can move in opposite directions. The outer end 18 of the piston 11 is pressed by a spring 19 directly against the contact surface of the lever 8. In the middle position A the inner edge 20 of the piston slides over a passage 21 in communication with an overflow pipe 22 to a liquid reservoir 23. Passages 24, 24' to which the pressure conduits 25, 25' of the pumps 15, 15' are joined (Fig. 3), communicate with the inner sides of the cylinder chambers 17, 17'.

The pump piston 14 guided in the housing 15 is constructed as a plunger with a plate 26 on its upper end. A spring 27 placed on the housing 15 maintains the piston 14 continuously in contact with the contact surface of the lever 12. In an extension at the lower end of the casing 15 is disposed a pressure valve 29 consisting of a ball and spring, which connects the pump chamber 30 with the pressure conduit 25. In the oppositely disposed extension 31 of the housing 15 there is disposed a suction valve 32 consisting of a ball and spring which connects the pump chamber 30 with the suction conduit 33. In the pressure conduit 25 is disposed a regulating air chamber 34 of known construction (Fig. 1).

The first adjustment of the spring suspension is effected in the following manner; first, the vehicle is raised by any suitable means. In this position the control valve 11 assumes the middle position A and the pump piston 14, in consequence of the completely slackened spring, takes up the upper end position. The pump piston 14 is raised by the spring 27 on the abutment and in this way fluid is sucked by the suction valve 32 into the pump chamber 30. Thereupon the lever 8 is moved outwardly in the direction of the arrow O until the inner edge 20 of the piston 11 frees the passage 21. Fluid from the collecting container 23 can now flow through the conduit 22 into the cylinder chamber 17. The vehicle is now gradually lowered so that the wheels take up the load, thereby causing tightening of the springs. Thereupon the piston 11 is pressed inwards in the direction of the arrow P until the pressure in the regulating air chamber 34 reaches equilibrium with the reaction of the support. Simultaneously the piston 14 moves downwards in the direction of the arrow V whereby fluid is forced through the pressure valve 29 into the air chamber 34. The pressure in the air chamber 34 thereupon increases gradually until a certain preliminary tensioning of the springs is effected which is sufficient for completely lowering the vehicle.

The automatic adjustment of the spring suspension is effected in the following way. As a result of the small preliminary tensioning of the springs, the half axles 2, 2' are disposed in the incorrect position B'' (negative set of the axle). By the periodic vibrations of the wheels 1', which are caused during travel over obstacles, and which gradually die out, the pump 15 now conveys fluid into the air regulator 34. Each movement of the wheels 1 in the direction of the arrow S corresponds in this connection to a working stroke of the pump piston in the direction of the arrow V. Thus the pressure in the air chamber 34 gradually increases and drives the piston 11 outwards in the direction of the arrow O. The spring 6 is thereupon further tightened, the vehicle is raised, and the position of the axle 2 altered in the direction of the arrow T in the correct way. This step lasts until the inner edge 20 of the piston 11 slides over the passage 21, thereby releasing the fluid to the passage 22, and in effect acting as a short-circuit. If the pump 15 is still working the piston 11 nevertheless cannot be further moved, and the pre-tensioning of the spring 6 cannot be increased. The axle 2 remains, therefore, in its correct position (normal set of the wheels) corresponding to the middle position A''. If now the wheels swing in this position of the axles the piston 11 acts as an oil brake, that is as a fixed abutment. If on the contrary the load on the vehicle increases, the piston 11 is again driven inwards, the passage 21 is again obturated, and the procedure described can begin again.

The vibrations of the wheels are effectively damped by the pumps 15, 15'. In order to increase this action the piston 14 can also be constructed as a shock absorber piston. It incorporates in this case a pressure valve 35 and a suction valve 36 which are adjustable by screws 37, 38. The passage 39 to the pressure valve 35 in the piston 14 is in this connection narrower than the passage 40 to the pressure valve 29 in the housing extension 28. Inversely, the passage 41 to the suction valve 36 in the piston 14 is wider than the passage 42 to the suction valve 32 in the housing extension 31 (Fig. 4).

If the piston 14 moves downwards in the direction of the arrow V a part of the fluid from the pump chamber 30 is conveyed through the passage 40 into the pressure conduit 25 and simultaneously another part through the passage 39 into the chamber 43 over the piston 14. If, however, the piston 14 moves upwards in the direction of the arrow U, fluid is sucked partly over the passage 41 from the chamber 43 and partly over the passage 42 from the suction conduit 33 into the pump chamber 30. The greater the pressure in the air regulator, the more loaded, therefore, is the pressure valve 29, and all the more does the pressure valve 35 come into action and the shock absorbing action become correspondingly emphasized. The construction described concerns an inversely acting shock absorber because the upward and not the downward movement of the wheels is damped; it is to be understood, however, that the inverse arrangement is possible.

In order to adjust the correct mutual position of the half axles 2, 2' the air regulator pressure on both sides of the vehicle must be maintained equally high. To this end the pressure conduits 25, 25' can be in communication through suitable over-pressure and compensating valves which act in such a way that during varying air regulator pressures a part of the fluid flows from one conduit into the other. The cross sections of these over-pressure and compensating valves need be only extremely small in order to bring about the pressure compensation gradually, that is with great delay. Since on manufacturing grounds completely similar springs for both sides of the vehicle can not be readily procured, it is preferable to provide the air chambers 34, 34' with adjusting devices which adjust the correct mutual position of the half axles from the outset. The over-pressure and compensating valves are in this case used only as safety valves.

It will accordingly be seen that by the use of my invention it is possible to adjust the tension of the springs in accordance with the vehicle load without necessitating a recourse to the usual adjusting gear and the like. This apparatus is simple and sure in operation; it can be installed in any existing rotary spring suspension without great expense. By the proper dimensioning of the lengths of the supporting levers for the spring abutment and of the driving lever for the pumps, the most favorable ratio between the pressure and quantity of the conveyed fluid can be secured independently of the vehicle load, together with the most favorable mounting of the pump and of the control cylinder, independently of the construction of the frame.

The word "frame" as herein used, is not to be understood as limited to such a device when formed separate from the body and coachwork of the vehicle, but as including such devices when formed integral with said body or coach work.

The invention is not limited to the above constructional examples. Instead of a mechanical conveying pump driven by the periodic movements of the wheels an automatically acting pump can also be used, which for example is constructed as a weight pump or spring weighted pump and is directly driven by the oscillating movements of the chassis. This pump must naturally, since its driving energy is smaller, be of correspondingly greater dimensions. The adjustment proceeds in a completely similar manner.

While I have herein shown and described only certain embodiments of certain features of my present invention, it is to be understood that they are to be regarded merely as illustrative and that I do not intend to limit myself and to expect as may be required by the claims which follow.

I claim:

1. In a vehicle, a body frame, a road wheel, a support for said road wheel and spring means connected at one end to said road wheel support and coacting at the other end with an abutment on said frame, and liquid pressure means interconnecting said abutment and frame for varying the relationship between said spring and said abutment.

2. In a vehicle, a body frame, a road wheel, a support for said road wheel and spring means connected at one end to said road wheel support and coacting at the other end with an abutment on said frame, and liquid pressure means interconnecting said abutment and frame for automatically varying the relationship between said spring and said abutment in accordance with the load carried by said vehicle.

3. In a vehicle, a body frame, a road wheel, a support for said road wheel and spring means connected at one end to said road wheel support and coacting at the other end with an abutment on said frame and liquid pressure means for automatically varying the relationship between said spring and said abutment in accordance with the load carried by said vehicle, said means being controlled by pump means connected between said frame and said wheel support.

4. Apparatus in accordance with claim 3 in which the pump means is also a means for dampening the vibrating movements of the road wheel support.

5. In a vehicle, a body frame, a road wheel, a support for said road wheel and spring means connected at one end to said road wheel support and coacting at the other end with an abutment on said frame and liquid pressure means for automatically varying the relationship between said spring and said abutment in accordance with the load carried by said vehicle, said means being controlled by pump means connected between said frame and said wheel support and conduits extending from said pump means to said abutment varying means.

6. In a vehicle, a body frame, a road wheel, a support for said road wheel and spring means connected at one end to said road wheel support and coacting at the other end with an abutment on said frame and fluid pressure means for automatically varying the relationship between said spring and said abutment in accordance with the load carried by said vehicle, said means being controlled by pump means connected between said frame and said wheel support and fluid conduits extending from said pump means to said abutment varying means and means for controlling the pressure in said conduits.

7. In a vehicle, a body frame, a plurality of road wheels, supports for each of said road wheels, and spring means for each of said supports connected at one end to its respective road wheel support and coacting at the other end with an abutment carried by said frame, fluid pressure actuated means for varying the position of said abutment, pump means connected between said frame and each of said wheel supports and conduits connecting said pump means with their respective fluid pressure actuated means.

8. Apparatus in accordance with claim 7 in which a plurality of said conduits are connected by pressure equalizing conduits.

9. In a vehicle having a frame, in combination, a wheel for said vehicle, means for pivotally connecting said wheel to said frame, rotary spring means attached at one end to said frame and at its other end to said wheel for the resilient support of said vehicle, and a fluid pressure regulating means mounted on said frame and attached to one end of said rotary spring means for controlling the tension of said spring.

10. The combination according to claim 9, in combination with a second fluid pressure means mounted on said frame and attached to the other end of said rotary spring means, whereby said two fluid pressure means form abutments for said spring.

11. The combination according to claim 9, in combination with a pump interconnected with said fluid pressure means and maintaining fluid pressure within the latter, and means responsive to the vibrations of said vehicle for actuating said pump.

12. In a vehicle having a frame, in combination, a wheel for said vehicle, means for pivotally connecting said wheel to said frame, a lever, rotary spring means attached at one end to said pivotal connecting means and at its other end to one end of said lever, a fluid pressure regulating device mounted on said frame and having a control piston connected to the other end of said lever, and a pump connected to said fluid pressure regulating device and supplying fluid thereto, said pump having a piston connected for actuation by said pivotal connecting means.

13. The combination according to claim 12 including a driving lever interconnecting the pump piston with the pivotally connecting means.

14. The combination according to claim 9 in which said fluid pressure regulating means comprises a cylinder having a piston and an outlet in said cylinder adapted to be opened in a predetermined position of said piston, in combination with a pump, a first conduit interconnecting the pressure side of said pump with the inlet of said fluid pressure regulating means, and a second conduit interconnecting the inlet of said pump with the opening in said cylinder, whereby said fluid pressure means is short-circuited in said predetermined position of said piston.

15. The combination according to claim 9, in combination with means for dampening the movement of said spring means and wheel, said dampening means comprising a pump having a piston connected to supply fluid to said fluid pressure means.

16. In a vehicle having a frame, in combination, a pair of wheels for said vehicle, means for pivotally connecting each of said wheels to said frame, a pair of springs, each attached at one end to said frame and at its other end to one of said wheels for the resilient supporting of said vehicle, a pair of fluid pressure regulating devices mounted on said frame and each attached to one end of one of said springs for controlling the tension thereof, a pair of conduits respectively connected to each of said fluid pressure devices for supplying fluid to the same, regulating air chambers in each of said conduits, and valve means interconnecting said conduits for maintaining the pressures in each substantially identical.

17. The combination according to claim 9 in which said pivotally connecting means are provided with trunnions, and means on said frame for rotatably supporting said trunnions, said rotary spring means being attached to and co-axial with said trunnions.

18. The combination according to claim 12 in which said pivotally connecting means are provided with trunnions, and means on said frame for rotatably supporting said trunnions, said rotary spring means being attached to and co-axial with said trunnions.

19. The combination according to claim 9 in which said rotary spring means extends substantially longitudinally of said vehicle.

20. The combination according to claim 12 in which said rotary spring means extends substantially longitudinally of said vehicle.

KARL RABE.